Nov. 3, 1970 A. W. KURZ, JR 3,537,778
REMOTE CONTROL FOR MIRROR
Filed Oct. 11, 1967 2 Sheets-Sheet 1

INVENTOR.
ARTHUR W. KURZ, JR.
ALFRED E. WILSON
ATTORNEY.

INVENTOR.
ARTHUR W. KURZ, JR.
ALFRED E. WILSON
ATTORNEY 3,537,778
REMOTE CONTROL FOR MIRROR
Arthur W. Kurz, Jr., 3871 Wedgewood,
Birmingham, Mich. 48010
Filed Oct. 11, 1967, Ser. No. 674,572
Int. Cl. G02b 5/08; F16h 1/18
U.S. Cl. 350—289                     5 Claims

ABSTRACT OF THE DISCLOSURE

An actuating device for adjusting the angular position of a vertically elongated rear view mirror about a vertical axis on a wide vehicle of the truck and bus type, wherein support arms are interposed between the pivots for the mirror and the vehicle door. Gearing mounted on one of the support arms is provided to adjust the mirror angularly, a switch positioned in the driver's compartment being proided for controlling a reversible electric motor for driving the gearing.

---

My invention relates to rear view mirrors for trucks, busses and other vehicles wherein the rear view mirror is positioned so far from the driver's compartment that it cannot be moved manually, and more particularly to the control from a remote point, of the relatively large rear view mirrors that pivot about a vertical axis.

In driving trucks, busses and other large vehicles it is imperative that rear view mirrors be used because it is impossible for the driver to observe road and traffic conditions behind the vehicle without the use of such mirrors. On large vehicles the mirrors are of necessity positioned so far out from the side of the cab that it is impossible for the driver to reach the mirrors to adjust their positions.

To avoid the necessity of adjusting rear view mirrors in two planes it is common practice to employ relatively high mirrors, approximately 10" or more in the vertical dimension. Drivers of varying stature are accommodated with mirrors of this type and the drivers can sit in different positions without having to adjust the mirrors about a horizontal axis. With mirrors of this type it is only necessary to adjust the mirrors about the vertical axis in order for the driver to observe road and traffic conditions behind the vehicle.

An object of my invention is to provide an improved rear view mirror control which may be operated from the driving position to permit the driver to shift the angular position of mirrors on opposite sides of the vehicle without moving from the driving position.

A further object of my invention resides in the provision of a motor actuated rotatable gear operably connected to a vertically pivoted mirror whereby the driver may, by merely operating a switch control lever located in the driver's compartment, adjust the mirrors about vertical axes on opposite sides of the vehicle.

Another object of my invention is to provide an improved rear view mirror control whereby the driver can while driving move the mirrors on opposite sides of the vehicle to observe road and traffic conditions behind the vehicle, and to enable him to watch the rear wheels.

In the drawings, wherein similar reference characters refer to similar parts throughout the several views.

Figure 1:
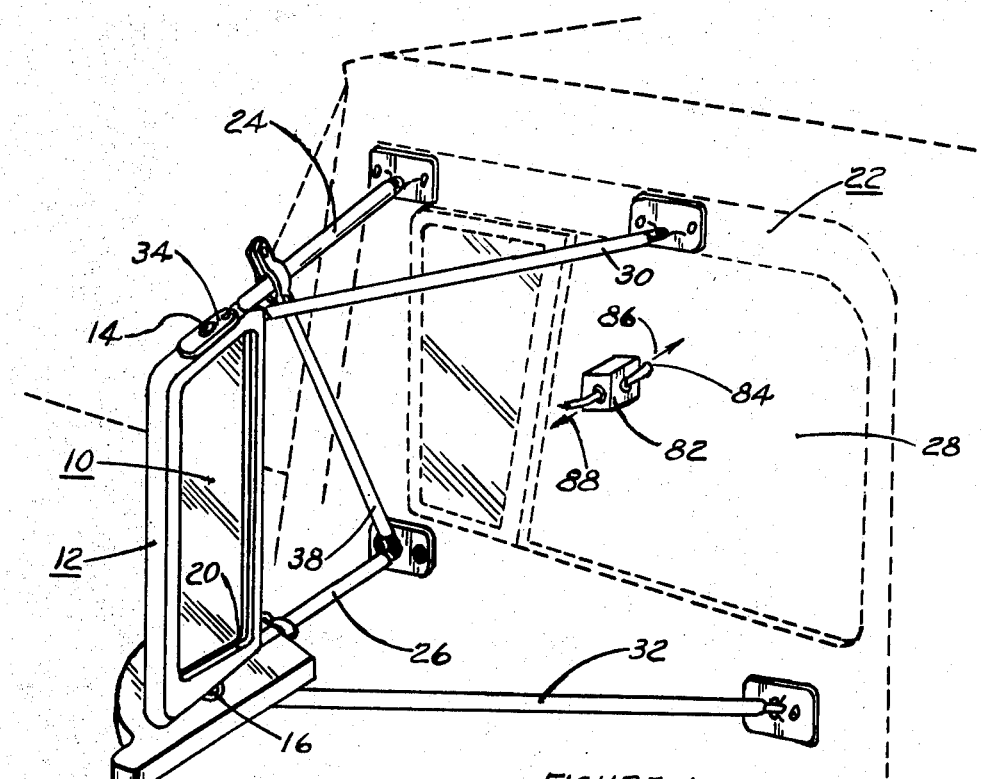
FIG. 1 is a perspective view illustrating my invention applied to a mirror of the truck type.

Referring now more particularly to FIG. 1, my invention is illustrated as applied to a rear view mirror 10 preferably formed of glass having a reflective surface. The mirror is of generally rectangular shape having a height to width ratio of approximately 2 to 1 or more, the vertical or long dimension being generally in excess of 10". The mirror 10 is relatively heavy to withstand the vibration and shocks to which it is subjected, and is mounted in a heavy protective frame 12. Resilient liner material such as strip rubber may be interposed between the mirror 10 and the frame 12 to cushion and absorb vibrational shocks.

The driver's compartments of large vehicles are narrower than the truck bodies and truck trailers. It is therefore necessary that the mirrors 10 be positioned laterally at a considerable distance to permit the driver to see beyond the sides of the vehicle to observe conditions along the side and to the rear of the vehicle. When so positioned it is impossible for the driver to reach the mirrors to adjust them, particularly the mirror positioned on the right hand side of the vehicle.

In view of the long vertical height of the mirror 10 it is not necessary to make any adjustments about a horizontal axis. This mirror 10 is mounted on the doors on opposite sides of the vehicle, and may be adjusted about the vertical axes to enable the driver to cover the entire range along the sides of the vehicle, close to and spaced further therefrom as desired by the driver. The frame 12 of the mirror 10 is provided with vertically extended pivots 14 and 16 at substantially the midpoints of the upper and lower frame members 18 and 20.

The mirrors 10 are preferably mounted on the doors 22 of the vehicle and move therewith. A pair of front upper and lower support arms 24 and 26 are suitably secured to the door 22, as by bolts or screws, the arm 24 being secured above the window opening 28 in the door and the arm 26 being secured beneath the window opening 28. A pair of rear upper and lower support arms 30 and 32 are also suitably secured to the door 22, and the arm 30 preferably being secured above the window opening and the arm 32 being secured to the door beneath the window. The upper front and rear support arms 24 and 30 are disposed angularly relative to each other and intersect at a bracket 34 which houses the upper pivot 14 of the mirror 10. The lower front and rear arms 26 and 32 are also angularly disposed relative to each other and are secured to a housing 36 which houses the lower pivot 16 fixed to the lower member 20 of the frame 12. Any desired number of brace members such as the member 38 extending from the lower support arms or from the door 22 of the vehicle to one of the upper arms 24 or 30 or to the bracket 34 may be employed to strengthen and rigidify the mirror supporting linkage. It will be noted that the front upper and lower arms 24 and 26 extend substantially perpendicular to the side of the door 22, and that the rear arms 30 and 32 extend at a substantial angle relative thereto. By this linkage arrangement it is possible to position the mirror 10 well forward relative to the window opening 28 so that it may be readily viewed by the driver of the vehicle.

It will be apparent that if desired one or more braces extending from the top, adjacent the door 22 downwardly and outwardly may be employed to further strengthen and rigidify the mirror support linkage. If desired the support arms may be of the telescoping type to permit adjustment of the lateral distance from the side of the door 22 to the mirror 10 to accommodate the linkage to various vehicles.

Figure 2:
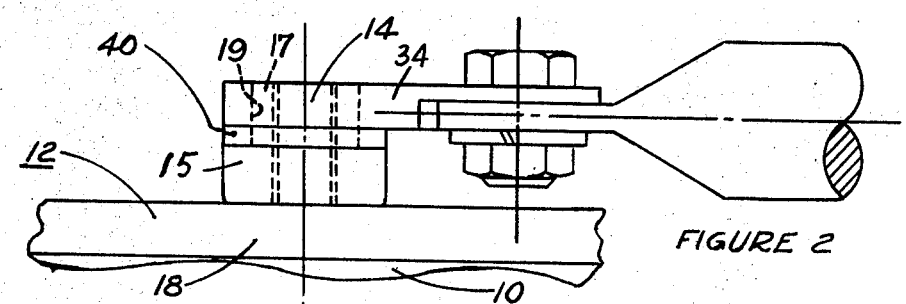
FIG. 2 is a fragmentary side view in elevation showing the upper pivot mechanism of my improved mirror control.
Figure 3:
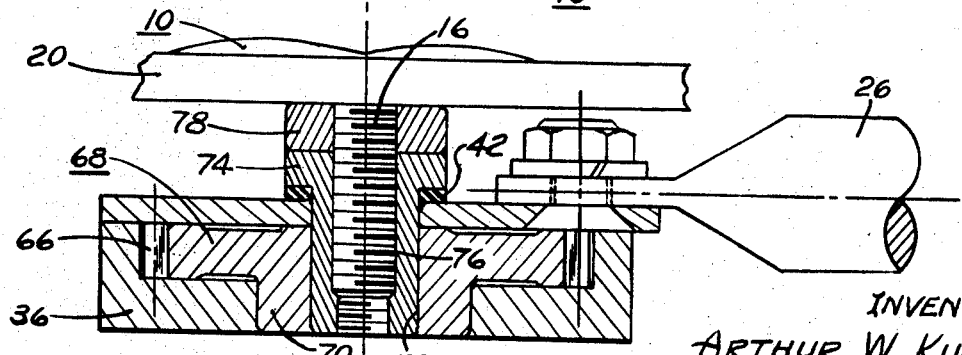
FIG. 3 is a fragmentary side elevational view partly in section showing the lower pivot mechanism, and is a view taken substantially on the line 3—3 of FIG. 4, looking in the direction of the arrows.

Referring now to FIGS. 2 and 3 it will be noted that the upper and lower pivots 14 and 16 of the mirror 10 are mounted in self aligning resilient washers 40 and 42 formed of rubber or other suitable material to receive the upper and lower threaded studs 14 and 16 of the mirror frame 12. The threaded upper stud 14 receives a nut 15 having an upper extension 17 which projects through an aperture 19 in the upper bracket 34. The extension 17 is thus rotatably supported by the inner-periphery of the aperture 19.

My improved mirror actuating mechanism consists of an electric motor 44 secured to the housing 36 and having a worm gear 46 operably connected to drive a gear 48 secured to a threaded shaft 50 journalled in bearings 52 and 54 in the housing 36. The gear 48 is preferably formed of nylon or other sound and vibration deadening material. The shaft 50 is externally threaded and is received within the internally threaded sleeve or rack 56 restrained against rotation. The sleeve or rack 56 is slidably mounted in an axial bore 58 and is movable in opposite directions between resilient bumpers 60 and 62. The sleeve or rack 56 has gear teeth 64 meshing with the gear teeth 66 of a gear 68 having a hub 70 journalled in the housing 36.

The gear 68 has a centrally disposed hexagonal shaped bore 72 to receive a plug adapter 74 having internal threads 76 to receive the threads of the lower stud 16 of the mirror, a lock nut 78 being provided to clamp the assembly together. The plug adapter 74 has a hexagonal outer shape to be received within the hexagonal shaped bore 72 of the gear 68.

The mirror 10 thus turns with the gear 68 at the lower mirror extremity and upon the pivot 14 and the nut 15 at the upper extremity.

Figure 4:
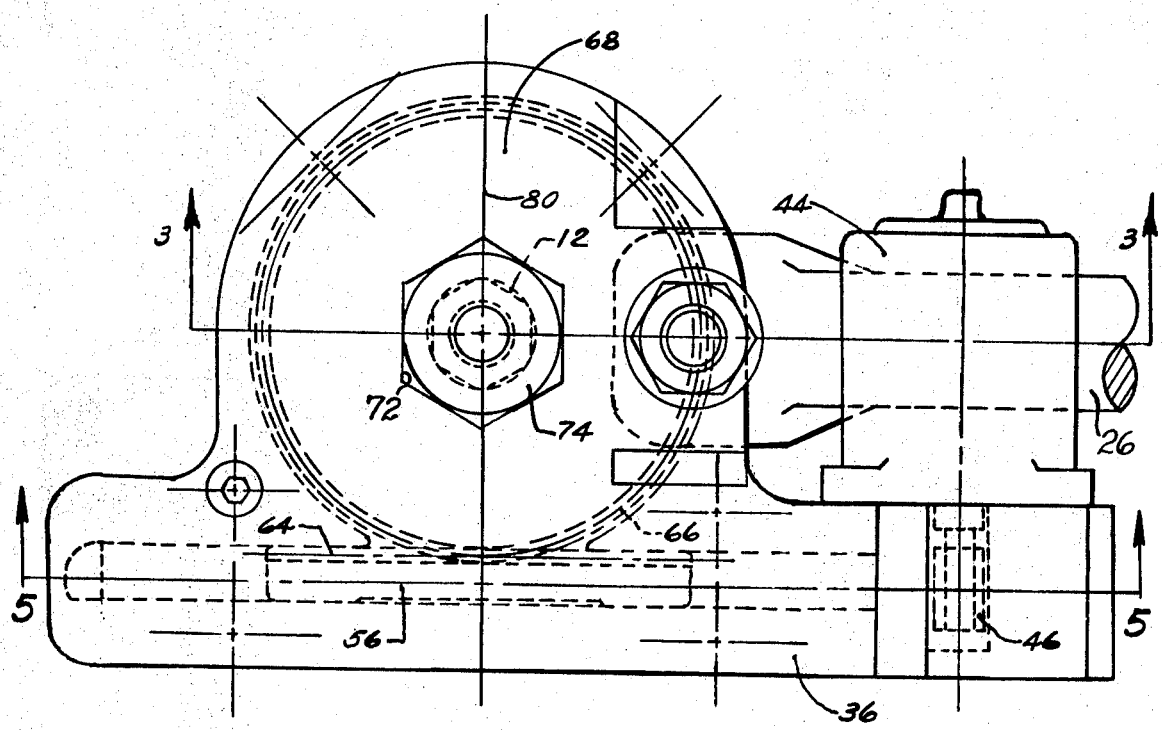
FIG. 4 is a bottom plan view of the actuating mechanism shown in FIG. 3.
Figure 5:
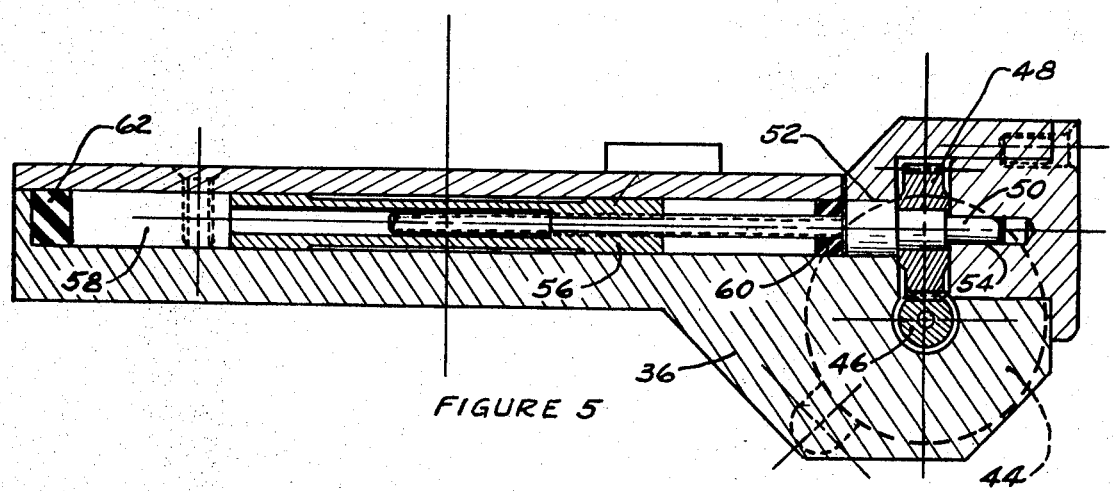
FIG. 5 is a sectional view taken substantially on the line 5—5 of FIG. 4, looking in the direction of the arrows.

The mechanism is proportioned in such a manner that as the rack or internally threaded sleeve 56 moves in opposite directions from the central position shown in FIGS. 4 and 5 into engagement with either of the resilient bumpers 60 or 62, the gear 68 and the plug adapter 74 and the mirror 10 secured thereto are moved 30° in opposite directions from the central position 80 of the sleeve or rack 56. In the adjustment of the mirrors to permit the driver to have full control of the desired field of vision it is only necessary to move the mirror through a relatively few degrees of angular adjustment about the vertical axis. In view of the fact that a 60° angularity of adjustment is possible with the plug adapter 74 set in any position in the gear 68, it will be apparent that an adequate range of adjustment is available. To change the quadrant of travel it is only necessary to shift the plug adapter 74 in the hexagonal shaped bore of the gear 68, or to change the adjusted position of the lower pivot 16 of the mirror 10 in the plug adapter 74 securing it in place by means of the lock nut 78.

My improved control device may be actuated by a control mechanism illustrated in FIG. 1 and consisting of a control switch 82 having a lever 84 preferably spring biased to a central or off position. The control switch 82 may be positioned at any convenient place in the driver's compartment. Where rear view mirrors are used on the right hand side of the vehicle, as is customary for trucks and other large vehicles, a separate control switch 82 may be employed to actuate each of the mirrors.

OPERATION

The operation is as follows. To move the mirror 10 in the counterclockwise direction as viewed from above to enable the driver to observe road and traffic conditions closer to the vehicle on the left hand side of the vehicle, and further away from the vehicle where a mirror is employed on the right hand side of the vehicle, the lever 84 of the control switch 82 is moved toward the right, in the direction of the arrow 86. The electric motor 44 then drives the gear 46 which in turn drives the gear 48 and the shaft 50 to move the rack or sleeve 56 inwardly toward the bumper 60. The rack 56 rotates the gear 68 in the counterclockwise direction to rotate the mirror 10 through the drive connection 72–74 between the gear 68 and the adapter plug 74.

To move the mirror in the opposite direction to permit the driver to observe the road to the left, further away from the vehicle on the left side, and closer to it on the right hand side, the lever 84 is moved toward the left, in the direction of the arrow 88. The electric motor 44 is thus driven in the opposite direction to drive the rack or sleeve 56 outwardly toward the bumper 62 thereby rotating the gear 68 in the clockwise direction as viewed in FIG. 4 to rotate the mirror in the clockwise direction as viewed from above, whereupon the field of vision is shifted toward the left.

While my invention has been described with particular reference to a specific embodiment it will be understood that various changes can be made without departing from the spirit of my invention as defined by the following claims.

I claim:

1. In a rear-view mirror for a truck or the like having support means defining spaced and aligned pivot elements and a mirror supported on said pivot elements exteriorly of said truck for pivotal movement about a single axis, the improvements of a gear pivotally movable with said mirror, a tubular rack drivingly engaging said gear, a rotatable shaft projecting through said tubular rack and upon which said rack is supported for axial displacement, said rack being restrained against rotation, interengaging thread means on said shaft and said rack for axially displacing said rack, reversibly actuatable power means for rotating said shaft, and control means located interiorly of said truck to control the extent and direction of actuation of said power means.

2. In a mirror as defined in claim 1, the further improvements wherein the entire mirror actuating assembly, including said power means, is disposed on said support means exterior to said truck.

3. In a mirror as defined in claim 1, the further improvements of stop means interposed in the path of movement of said rack to limit the axial displacement thereof and means for adjusting said mirror rotationally relative to said gear to determine a range of pivotal movement of said mirror upon actuation of said power means, said range being consistent with the extent of movement of said rack means between said stop means.

4. In a mirror as defined in claim 3, the further improvements wherein said adjusting means includes a polygonal bore in said gear and a polygonal projection fixed to said mirror for selective rotationally adjusted insertion into said bore, thereby adjusting the relative rotational positions of said mirror and said gear, each such adjustment determining a range of mirror pivotal movement upon actuation of said power means.

5. In a mirror as defined in claim 3, the further improvements wherein said adjusting means includes a socket connection between said gear and said mirror whereby selective relative adjusting movement there between can be made to adjust the range mirror pivotable movement.

(References on following page)

References Cited

UNITED STATES PATENTS

| | | | |
|---|---|---|---|
| 2,877,686 | 3/1959 | Foster | 350—289 |
| 3,064,489 | 11/1962 | Deprez et al. | 74—422 X |
| 3,075,073 | 1/1963 | Hildebrecht | 74—89 X |
| 3,075,431 | 1/1963 | White | 350—289 |
| 3,429,639 | 2/1969 | Peters | 350—289 |
| 1,622,157 | 3/1927 | Law | 248—485 |
| 2,623,986 | 12/1952 | Falge | 248—479 X |
| 2,625,218 | 1/1952 | Nihon | 74—425 X |
| 2,664,785 | 1/1954 | Roehrig | 248—487 |
| 2,860,546 | 11/1958 | Bolser | 248—477 |
| 2,944,277 | 7/1960 | Ochello | 248—279 |
| 3,277,678 | 10/1966 | Booth | 74—501 X |
| 3,392,488 | 7/1968 | Werner | 74—501 X |

FRED C. MATTERN, Jr., Primary Examiner

C. F. GREEN, Assistant Examiner

U.S. Cl. X.R.

74—424.6, 501, 507